(No Model.)

M. JEFFERSON, W. W. L. LISHMAN & J. CLAPHAM.
BEARING FOR SHAFTS.

No. 574,246.  Patented Dec. 29, 1896.

WITNESSES:
Holmes Clapham
Newby Dixon

INVENTORS:
Mordecai Jefferson
Walter William Lancaster Lishman
John Clapham

UNITED STATES PATENT OFFICE.

MORDECAI JEFFERSON, OF BRADFORD, WALTER WILLIAM LANCASTER LISHMAN, OF CORNHOLME, AND JOHN CLAPHAM, OF BRADFORD, ENGLAND.

BEARING FOR SHAFTS.

SPECIFICATION forming part of Letters Patent No. 574,246, dated December 29, 1896.

Application filed August 22, 1896. Serial No. 603,663. (No model.)

*To all whom it may concern:*

Be it known that we, MORDECAI JEFFERSON, residing at Bradford, in the county of York, WALTER WILLIAM LANCASTER LISHMAN, residing at Cornholme, in the county of Lancaster, and JOHN CLAPHAM, residing at Bradford, in the county of York, England, subjects of Her Majesty the Queen of Great Britain, have invented a certain new and useful Improved Bearing for Shafts, of which the following is a specification.

Our object is to provide an improved bearing for shafts adapted to contain a supply of lubricant enabling the shaft to run for a considerable period, while the construction of the bearing prevents overflow and waste of the lubricant and protects it from the dust and dirt which may be carried in the atmosphere.

Our invention is illustrated in the accompanying drawings, in which—

Figure 1:
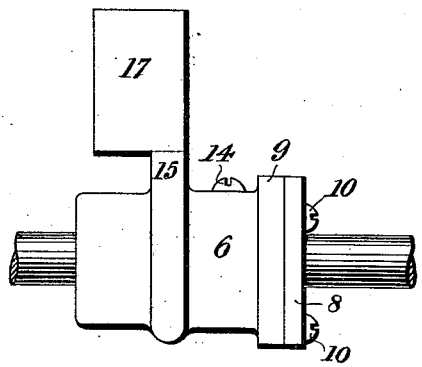
Figure 2:
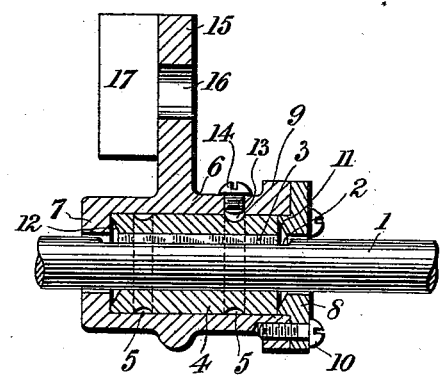
Figure 3:
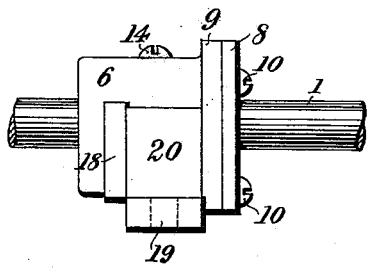
Figure 4:
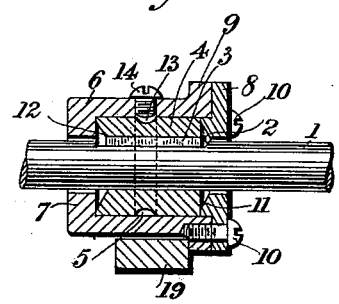
Figure 5:
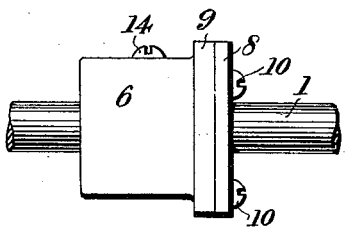
Figure 6:
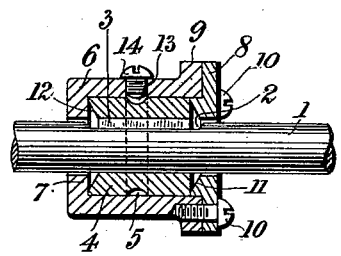

Figure 1 is an elevation of one form of bearing and hanger. Fig. 2 is a sectional elevation of Fig. 1. Fig. 3 is an elevation of another form of bearing with a bracket-holder. Fig. 4 is a sectional elevation of same. Fig. 5 is an elevation of the same bearing without any supporting device, and Fig. 6 is a sectional elevation of same.

Referring to Figs. 1 and 2, the shaft 1 is grooved at 2 to receive a wedge 3 for the purpose of holding on said shaft a cylindrical boss 4, having two grooves 5 5 therein, or the boss may be secured to the shaft in other ways.

The shaft and boss rotate freely in a fixed casing 6, having a shoulder 7 at one end which serves to close that end of the casing, the other end being closed by a cover 8, attached to a flange 9 by screws 10 or by other means, or the casing may be closed at both ends by loose covers 8.

The cover carries an angular-faced ring 11, which serves to keep the boss in place, the angular face affording a space which assists in holding the lubricating material and enables it to circulate somewhat in the casing, while it also enables the fitting of the parts to be effected with less work in machining the faces of the boss and flange. The other end of the boss is also cut at an angle, as shown at 12, for the same purposes.

To fill the casing with lubricating material, a hole 13, closed by a screw or like plug 14, is arranged in the casing over one of the grooves 5. In Figs. 1 and 2 a hanger 15 is shown as forming part of the casing, said hanger being provided with a slot 16, by which it may be attached to some fixed part, and with ear-pieces 17 for steadying same.

The bearing shown in Figs. 3 and 4 is the same in arrangement as that described, except that the boss 4 is shorter and only one groove 5 is employed. It is, however, provided on the outside with lugs 18 on each side, which, together with the flange 9, form a means for supporting the bearing in a bracket 19, which is provided for the purpose with two ear-pieces 20, (one only of which is shown,) between which the bearing may be dropped. An extension of the part 19 forms the arm of the bracket proper.

The bearing shown in Figs. 5 and 6 is identical with that described above, but is not provided with a special hanger or bracket, said bearing being adapted to be held by hangers or brackets of other kinds or in other ways.

Upon oil or lubricant being poured into the hole 13 the groove 5 will be filled and a film of the lubricating material will spread over the surface of the boss 4, the cover 8 and shoulder 7 preventing the lubricant escaping at the ends. It is evident that the groove 5 may be formed in the interior of the casing 6 instead of in the boss 4.

By this construction an exceedingly cheap and simple self-lubricator bearing is provided.

What we claim is—

In a shaft-bearing, the combination with the shaft, a cylindrical boss having an annular groove to receive lubricating material and an inwardly-beveled end, and a key for holding the said boss firmly upon the shaft; of a fixed casing having one end closed around the said shaft, in which the said boss is adapted to rotate, the said casing having an opening for the admission of lubricating material, means for closing the said opening, a cover closing the open end of the said casing, means for securing the said cover in place, and an inwardly-beveled ring formed on the cover and bearing on the said boss, substantially as described.

In testimony whereof we have hereunto set our hands in the presence of two subscribing witnesses.

MORDECAI JEFFERSON.
WALTER WILLIAM LANCASTER LISHMAN.
JOHN CLAPHAM.

Witnesses:
HOLMES CLAPHAM,
NEWBY DIXON.